Patented July 3, 1934

1,964,868

UNITED STATES PATENT OFFICE 1,964,868

PROCESS OF PREPARING METHYLENE CHLORIDE

Walter Berndt and Otto Ernst, Hochst-on-the-Main, Germany, assignors to I. G. Farbenindustrie Aktiengesellschaft, Frankfort-on-the-Main, Germany, a corporation of Germany No Drawing. Application December 28, 1927, Serial No. 243,205. In Germany January 3, 1927

3 Claims. (Cl. 260—166)

Our present invention relates to a new process of preparing methylene chloride.

Methylene chloride has hitherto been prepared either by treating chloroform with zinc and hydrochloric acid in an alcoholic solution (cf. Ullman "Enzyklopädie der Technischen Chemie" volume 8, page 90) or by chlorinating methane. In the latter case there is always obtained a mixture of methane chlorides in which according to the working conditions there are predominating either the methyl chloride or the higher-chlorinated products such as chloroform and carbon tetrachloride.

Now we have found that methylene chloride is obtained with a considerably better yield by starting from methyl chloride instead of methane and by using methyl chloride and chlorine in the proportion of about two to five parts by volume to one part respectively. The methyl chloride can be chlorinated in a known manner in the presence or absence of catalysts or light. In order to obtain a good yield of methylene chloride it is advantageous to use an excess of methyl chloride; even a mixture in the proportion of 3 volumes of methyl chloride : 1 volume of chlorine is sufficient for preparing a chlorination product consisting of about 90 to 92 per cent. of methylene chloride and 8 to 10 per cent. of chloroform besides slight traces of carbon tetrachloride. It has hitherto not been known that the chlorination of methyl chloride occurs in quite another manner than that of the methane. It is true that the chlorination of methyl chloride has qualitatively been investigated and that the formation of methylene chloride has been disclosed; it was, however, not discovered that almost pure methylene chloride can be obtained in this way, if the conditions are suitably selected. With regard to the behaviour of the methane during the chlorination process it is an entirely surprising fact that when chlorinating methyl chloride, the formation of methylene chloride proceeds in a favored manner even in consideration of the difference that in the case of the chlorination of methane the methylene chloride constitutes the second chlorination stage, whereas it is the first one in the case of the chlorination of methyl chloride.

The following examples illustrate our invention, but they are not intended to limit it thereto:

(1) A mixture of 3 parts by volume of methyl chloride and 1 part by volume of chlorine is passed at the rate of 120 liters per hour through a tube of a capacity of 750 to 800 ccm. and heated to 360° C. to 380° C. The reaction mixture leaving the tube is free from chlorine; the hydrochloric acid which has been formed is eliminated therefrom by washing it with water and the product is then worked up in known manner. The excess of methyl chloride is again used for the reaction after being mixed with the gases consumed. The chlorination product consists of 92 per cent. of methylene chloride, 8 per cent. of chloroform and traces of carbon tetrachloride.

(2) A mixture of 4 volumes of methyl chloride and 1 volume of chlorine is passed through a reaction chamber heated to 300° C. to 350° C. containing a catalyst of iron chloride on pumice stone. The clorination product leaving the chamber consists approximately of 3 parts by volume of methyl chloride, 1 volume of hydrogen chloride and 1 volume of chlorination products. The hydrogen chloride is washed out by means of water and the mixture of methyl chloride and chlorination products is separated by fractional condensation. The liquefied mixture of the chlorination products consists of about 90 per cent. of methylene chloride and 10 per cent. of higher-chlorinated products, mostly of chloroform.

(3) 2 volumes of methyl chloride and 1 volume of chlorine are exposed in known manner to light at ordinary temperature in a vessel made of lead. The product is worked up in the above described manner. The chlorination product contains 90 per cent. of methylene chloride.

(4) 5 volumes of methyl chloride and 1 volume of chlorine are passed through a narrow tube heated to 350° C. to 370° C. under a pressure of 5 atmospheres. After the gas has passed through the reaction tube, it is released from its pressure. The gas is then washed under ordinary pressure, condensed by cooling it down below the boiling point of the methyl chloride and separated into its constituents by fractional distillation. The chlorinated portion consists of about 91 per cent. of methylene chloride and 9 per cent. of chloroform including small quantities of carbon tetrachloride.

In the following claims the expression "agents capable of promoting the reaction" is to be understood to comprise the use of catalysts, active light or pressures.

We claim:

1. In the process of preparing methylene chloride, the step of treating 3 parts by volume of a gas consisting of methyl chloride in the gaseous state with one part by volume of chlorine at a temperature between 360° C. and 380° C.

2. In the process of preparing methylene chloride, the step of treating two to five parts by volume of a gas consisting of methyl chloride in the gaseous state with one part by volume of chlorine at a temperature between 300° C. and 380° C.

3. In the process of preparing methylene chloride, the step of treating two to five parts by volume of a gas consisting of methyl chloride in the gaseous state with one part by volume of chlorine at a temperature between 300° C. and 380° C., while employing agents capable of promoting the reaction.

WALTER BERNDT.
OTTO ERNST.